United States Patent
Saito et al.

(10) Patent No.: US 9,827,638 B2
(45) Date of Patent: Nov. 28, 2017

(54) HEAT EXCHANGER AND METHOD OF MANUFACTURING THE SAME

(71) Applicant: KEIHIN THERMAL TECHNOLOGY CORPORATION, Oyama-shi (JP)

(72) Inventors: Takahisa Saito, Oyama (JP); Kengo Chiba, Oyama (JP); Yoshinori Nakata, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 295 days.

(21) Appl. No.: 14/791,478

(22) Filed: Jul. 6, 2015

(65) Prior Publication Data
US 2016/0003548 A1   Jan. 7, 2016

(30) Foreign Application Priority Data
Jul. 7, 2014   (JP) .................................. 2014-139499

(51) Int. Cl.
*F28D 1/02*     (2006.01)
*B23P 15/26*    (2006.01)
(Continued)

(52) U.S. Cl.
CPC ............ *B23P 15/26* (2013.01); *B23K 1/0012* (2013.01); *B23K 1/012* (2013.01); *F28D 1/0391* (2013.01);
(Continued)

(58) Field of Classification Search
CPC .... F28D 1/0391; F28D 1/05391; F28F 1/128; F28F 9/02; F28F 9/18; F28F 21/089;
(Continued)

(56) References Cited

U.S. PATENT DOCUMENTS 6,298,910 B1 * 10/2001 Komoda ............. B23K 1/0012
                                                            165/133
6,651,333 B2 * 11/2003 Letrange .................. F28F 9/02
                                                           29/890.052
(Continued)

FOREIGN PATENT DOCUMENTS

JP      09-113177       5/1997
JP      2009-168360     7/2009

*Primary Examiner* — Len Tran
*Assistant Examiner* — Jon T Schermerhorn
(74) *Attorney, Agent, or Firm* — Mori & Ward, LLP (57) ABSTRACT

Each heat exchange tube of a condenser is formed of a first brazing sheet having a core material and a first brazing material covering the core material. The tank body of each header tank is formed of a second brazing sheet having a core material and a third brazing material covering the core material and being lower in flowability than the first brazing material. In a region of a surface of each protrusion portion facing the corresponding heat exchange tube, the region having a predetermined width as measured from the projecting end, the core materials of the two brazing sheets are brazed together by means of the first brazing material. In the region other than the brazed portion, the core materials of the two brazing sheets are brazed together by means of a fillet formed of a mixture of the first and third brazing materials.

4 Claims, 5 Drawing Sheets (51) Int. Cl.
   *F28F 9/013*   (2006.01)
   *B23K 1/00*    (2006.01)
   *B23K 1/012*   (2006.01)
   *F28F 9/02*    (2006.01)
   *F28F 9/18*    (2006.01)
   *F28F 21/08*   (2006.01)
   *F28D 1/03*    (2006.01)
   *F28D 1/053*   (2006.01)
   *F28F 1/12*    (2006.01)
   *B23K 101/14*  (2006.01)

(52) U.S. Cl.
   CPC .......... *F28D 1/05391* (2013.01); *F28F 1/128* (2013.01); *F28F 9/0131* (2013.01); *F28F 9/02* (2013.01); *F28F 9/18* (2013.01); *F28F 21/089* (2013.01); *B23K 2201/14* (2013.01); *F28F 2275/04* (2013.01)

(58) Field of Classification Search
   CPC ........ F28F 2275/04; F28F 9/0246; F28F 9/04; F28F 9/013; F28F 9/0131
   See application file for complete search history.

(56) References Cited

U.S. PATENT DOCUMENTS

| | | | | |
|---|---|---|---|---|
| 2005/0051319 | A1* | 3/2005 | Crook | F02B 29/0456 165/178 |
| 2006/0175047 | A1* | 8/2006 | Hattori | B21D 53/085 165/133 |
| 2007/0000657 | A1* | 1/2007 | Emrich | B21D 39/06 165/173 |
| 2008/0216989 | A1* | 9/2008 | Grajzl | F28D 1/05366 165/76 |
| 2009/0282850 | A1* | 11/2009 | Higashiyama | F25B 39/02 62/239 |
| 2012/0318488 | A1* | 12/2012 | Hyogo | B23K 1/0012 165/182 |

* cited by examiner

HEAT EXCHANGER AND METHOD OF MANUFACTURING THE SAME

BACKGROUND OF THE INVENTION

The present invention relates to a heat exchanger and to a method of manufacturing the same. More particularly, the present invention relates to a heat exchanger which is used as a condenser for a car air conditioner mounted on a vehicle such as an automobile, and to a method of manufacturing the heat exchanger.

In this specification and claims, the term "aluminum" encompasses aluminum alloys in addition to pure aluminum. Also, materials represented by chemical symbols represent pure materials, and the term "Al alloy" means an aluminum alloy.

There has been known a heat exchanger which has the following structure and is used as a condenser for a car air conditioner (see Japanese Patent Application Laid-Open (kokai) No. H09-113177). The heat exchanger has a plurality of flat heat exchange tubes formed of an aluminum extrudate, header tanks, corrugated aluminum fins, and aluminum side plates. The flat heat exchange tubes are disposed at predetermined intervals in the thickness direction such that their longitudinal directions coincide with one another and their width directions coincide with an air-flow direction. The header tanks are disposed at opposite longitudinal ends of the heat exchange tubes such that their longitudinal directions coincide with the direction in which the heat exchange tubes are juxtaposed. Opposite ends of the heat exchange tubes are connected to the corresponding header tanks. Each of the fins is disposed between adjacent heat exchange tubes or on the outer side of the heat exchange tube at each of opposite ends, and is brazed to the corresponding heat exchange tube(s). The side plates are disposed outward of the fins at opposite ends and are brazed to the corresponding fins. Each of the header tanks is composed of a tubular tank body formed of aluminum and closing members formed of aluminum. The tank body is formed by bending, into a tubular shape, an aluminum brazing sheet having a brazing material layer on each of opposite sides thereof and brazing opposite side edges of the sheet which are butted against each other. The tank body has openings at opposite ends thereof. The closing members are brazed to the opposite ends of the tank body so as to close the openings at the opposite ends. The tank body has a plurality of tube insertion holes (through holes) elongated in the air-flow direction and spaced from one another in the longitudinal direction of the tank body. Protrusion portions protruding toward the inner space of the tank body are integrally formed along edges of each tube insertion hole which are located on opposite sides in the width direction and which face each other. An end portion of each heat exchange tube is inserted into the corresponding tube insertion hole and is brazed to a portion of the tank body around the tube insertion hole and to the corresponding protrusion portions.

The heat exchanger disclosed in the publication is manufactured by a method which includes simultaneous brazing of heat exchange tubes, tank body members, closing members, fines, and side plates. Each tank body member is formed by bending, into a tubular shape, an aluminum brazing sheet having a brazing material layer on each of opposite sides thereof, and opposite side edges of the member butted against each other are not brazed together.

In recent years, heat exchangers have been demanded to have an enhanced performance, a reduced weight, and a reduced size. A conceivable way to satisfy such demand is decreasing the thickness of the wall of each heat exchange tube and decreasing the tube height which is the dimension of each heat exchange tube in the thickness direction. However, in the case of heat exchange tubes formed of aluminum extrudate, there arises a problem in that when a decreased wall thickness of each heat exchange tube and a decreased tube height which is the dimension of each heat exchange tube in the thickness direction are realized, production cost increases.

In view of this, there has been proposed a flat heat exchange tube which can decrease the tube wall thickness and the tube height while suppressing an increase in production cost (see Japanese Patent Application Laid-Open (kokai) No. 2009-168360).

The flat heat exchange tube disclosed in the publication is formed by bending an aluminum brazing sheet having a brazing material layer on each of opposite sides thereof and brazing portions of the sheet which are to be joined. The heat exchange tube has a pair of flat walls facing each other, two side walls provided between opposite side edges of the two flat walls, and a wavy partition member which divides the internal space into a plurality of refrigerant passages extending in the length direction of the tube. Each of the flat walls is formed as a single member as a whole. The two side walls are flat and extend in the height direction of the tube. One side wall is integrally provided between one side edge of one flat wall and one side edge of the other flat wall, and the other side wall is integrally provided at the other side edge of the one flat wall. A flat reinforcing member extending in the tube height direction is integrally provided at the side edge of the other flat wall on the side where the other side wall is present. The partition member is integrally formed such that the partition member extends from the distal end of the reinforcing member toward the one side wall. Another flat reinforcing member extending in the tube height direction is integrally provided at the side edge of the partition member on the side where the one side wall is present. The two side walls and the two reinforcing members are overlaid and brazed together in such a manner that one side wall and the corresponding reinforcing member come into contact with each other and form a layered structure. The partition member has a wavy shape and has a plurality of partition walls and connection portions. The partition walls extend in the tube length direction, are juxtaposed in the width direction of the tube, and each separates adjacent refrigerant passages from each other. The connection portions of the partition member connect adjacent partition walls together and are joined to the inner surfaces of the two flat walls. The connection portions of the partition member located on one side in the tube height direction are brazed to the one flat wall, and the connection portions of the partition member located on the other side in the tube height direction are brazed to the other flat wall.

In the case where the heat exchange tube disclosed in Japanese Patent Application Laid-Open No. 2009-168360 is applied to the heat exchange tube disclosed in Japanese Patent Application Laid-Open No. H09-113177, the heat exchanger is manufactured by the following method. Specifically, through use of an aluminum brazing sheet having a brazing material layer on each of opposite sides thereof, heat exchange tube members and tank body members are manufactured. Each of the heat exchange tube members is a bent member which is to become a flat heat exchange tube and in which the two side walls and the two reinforcing members are not brazed and the two flat walls and the connection portions of the partition member are not brazed. Each of the tank body members has opposite side edges which are butted against each other but are not brazed together, and has tube insertion holes and protrusion portions. The heat exchange tube members, the fins, and the side plates are combined together, and the tank body members and the closing members are combined together. Subsequently, after opposite end portions of the heat exchange tube members are inserted into the tube insertion holes of the tank body members, the two side walls and the two reinforcing members of each heat exchange tube member are brazed together and the two flat walls and the connection portions of the partition member are brazed together, whereby the heat exchange tubes are made. Further, the butted portions of each tank body member are brazed together to form a tank body. Also, the tank body and the closing members are brazed together so as to produce each of the header tanks. Simultaneously, the heat exchange tubes and the fins are brazed together, the fins and the side plates are brazed together, and the heat exchange tubes are brazed to portions of the tank bodies around the tube insertion holes and to the protrusion portions whereby the heat exchanger is manufactured.

Although not clearly shown in the above-mentioned two publications, the brazing material covering the outer surface of the tank body member of each header tank and the brazing material covering the outer surface of each heat exchange tube member have similar degrees of flowability when melted.

However, in this case, when brazing is performed, the brazing material covering the outer surface of the tank body member of each header tank melts, and the molten brazing material flows toward the heat exchange tube members which form the heat exchange tubes, whereby the amount of the brazing material becomes excessive, which causes a problem in that erosion becomes more likely to occur in a region of the outer circumferential surface of each heat exchange tube formed from the heat exchange tube member, the region being located near the corresponding header tank.

SUMMARY OF THE INVENTION

An object of the present invention is to solve the above-described problem and to provide a heat exchanger which can prevent erosion of heat exchange tubes, and a method of manufacturing such a heat exchanger.

A heat exchanger according to the present invention comprises a plurality of flat heat exchange tubes disposed at predetermined intervals in a thickness direction of the tubes in such a manner that their longitudinal directions coincide with one another and their width directions coincide with an air-flow direction; and two header tanks disposed at opposite longitudinal ends of the heat exchange tubes in such a manner that their longitudinal directions coincide with a direction in which the heat exchange tubes are juxtaposed, opposite end portions of the heat exchange tubes being connected to the corresponding header tanks, each of the header tanks being composed of a tubular tank body which has openings at opposite ends thereof, and closing members which are brazed to the opposite ends of the tank body so as to close the openings, the tank body having a plurality of tube insertion holes which are formed at predetermined intervals in a longitudinal direction of the tank body and each of which is an elongated hole whose longitudinal direction coincides with the air-flow direction, protrusion portions which project toward an inner space of the tank body being formed along edges of each tube insertion hole which are located on opposite sides in a width direction of the tube insertion hole and which face each other, and an end portion of each heat exchange tube being inserted into the corresponding tube insertion hole and being brazed to a portion of the tank body around the tube insertion hole and the protrusion portions. Each heat exchange tube is formed of a first brazing sheet having a core material and a brazing material covering an outer surface of the core material, and the tank body of each header tank is formed of a second brazing sheet having a core material and a brazing material covering an outer surface of the core material and being lower in flowability than the brazing material of the first brazing sheet used to form the heat exchange tube. Each of the protrusion portions has a projection height equal to or greater than a thickness of a circumferential wall of the tank body and has a thickness which decreases gradually toward a projecting end thereof. In a region of a surface of each protrusion portion facing the corresponding heat exchange tube, the region having a predetermined width as measured from the projecting end, the core material of the second brazing sheet is brazed to the core material of the first brazing sheet by means of the brazing material covering the outer surface of the first brazing sheet. In a region of the surface of each protrusion portion facing the corresponding heat exchange tube, the region remaining after exclusion of the brazed portion, a distance between the core material of the second brazing sheet and the core material of the first brazing sheet increases gradually from a side closer to the brazed portion toward the outside of the tank body, and a brazing material accumulation space is formed between the core materials of the two brazing sheets. Portions of the core materials of the two brazing sheets which form the brazing material accumulation space are brazed to each other by means of a fillet formed in the brazing material accumulation space, the fillet being formed of a mixture of the brazing material covering the outer surface of the first brazing sheet and the brazing material covering the outer surface of the second brazing sheet.

Preferably, a relation of $Y/X=0.40$ to $1.40$ is satisfied, where X is a length (mm) of the brazed portion of the surface of each protrusion portion facing the corresponding heat exchange tube, the length being measured in the longitudinal direction of the heat exchange tube, and Y is a length (mm) of the fillet formed in the brazing material accumulation space as measured in the longitudinal direction of the heat exchange tube.

The above-described heat exchanger is manufactured by a method comprising:

forming each of flat, hollow heat exchange tube members through use of a first brazing sheet having a core material and a brazing material covering one surface of the core material, each of the heat exchange tube members having an outer surface covered with the brazing material and having potions to be joined together;

forming each of tubular tank body members through use of a second brazing sheet having a core material and a brazing material covering one surface of the core material and being lower in flowability than the brazing material of the first brazing sheet used to form the heat exchange tube, each of the tank body members having an outer surface covered with the brazing material, having potions to be joined together, and having a plurality of tube insertion holes and protrusion portions;

rendering the projection height of each protrusion portion of each tank body member equal to or greater than the thickness of the circumferential wall of the tank body, gradually decreasing the thickness of each protrusion portion toward the projecting end thereof, and exposing the core material of the second brazing sheet in a region of the surface of each protrusion portion facing the corresponding heat exchange tube, the region having a predetermined width as measured from the projecting end;

combining the tank body members and the closing members, and inserting opposite end portions of the heat exchange tube members into the tube insertion holes of the corresponding tank body members;

bringing an exposed portion of each protrusion portion of each tank body member where the core material is exposed into contact with the outer surface of the corresponding heat exchange tube member, and, in a region of the protrusion portion remaining after exclusion of the exposed portion, gradually increasing the distance between the surface of the protrusion portion facing the heat exchange tube member and the outer surface of the heat exchange tube member from the side closer to the exposed portion toward the outside of the tank body member, to thereby form a brazing material accumulation space;

heating an assembly of the tank body members, the closing members, and the heat exchange tube members to a predetermined temperature so as to braze the to-be-joined portions of each heat exchange tube member to thereby form each of the heat exchange tubes, braze the to-be-joined portions of each tank body member to thereby form each of the tank bodies, braze each tank body and the corresponding closing members to thereby form each of the header tanks; and simultaneously with formation of the heat exchange tubes and formation of the header tanks, brazing the exposed portion of each protrusion portion to an outward facing surface of the core material of the first brazing sheet forming the corresponding heat exchange tube member by means of the brazing material of the first brazing sheet covering the outer surface of the heat exchange tube member, and forming in the brazing material accumulation space a fillet formed of a mixture of the brazing material of the first brazing sheet covering the outer surface of the heat exchange tube member and the brazing material of the second brazing sheet covering the outer surface of the tank body member, to thereby brazing together portions of the core materials of the two brazing sheets which form the brazing material accumulation space through the fillet.

DESCRIPTION OF THE PREFERRED EMBODIMENT

An embodiment of the present invention will next be described with reference to the drawings. In the embodiment, a heat exchanger according to the present invention is applied to a condenser for a car air conditioner.

Figure 1:
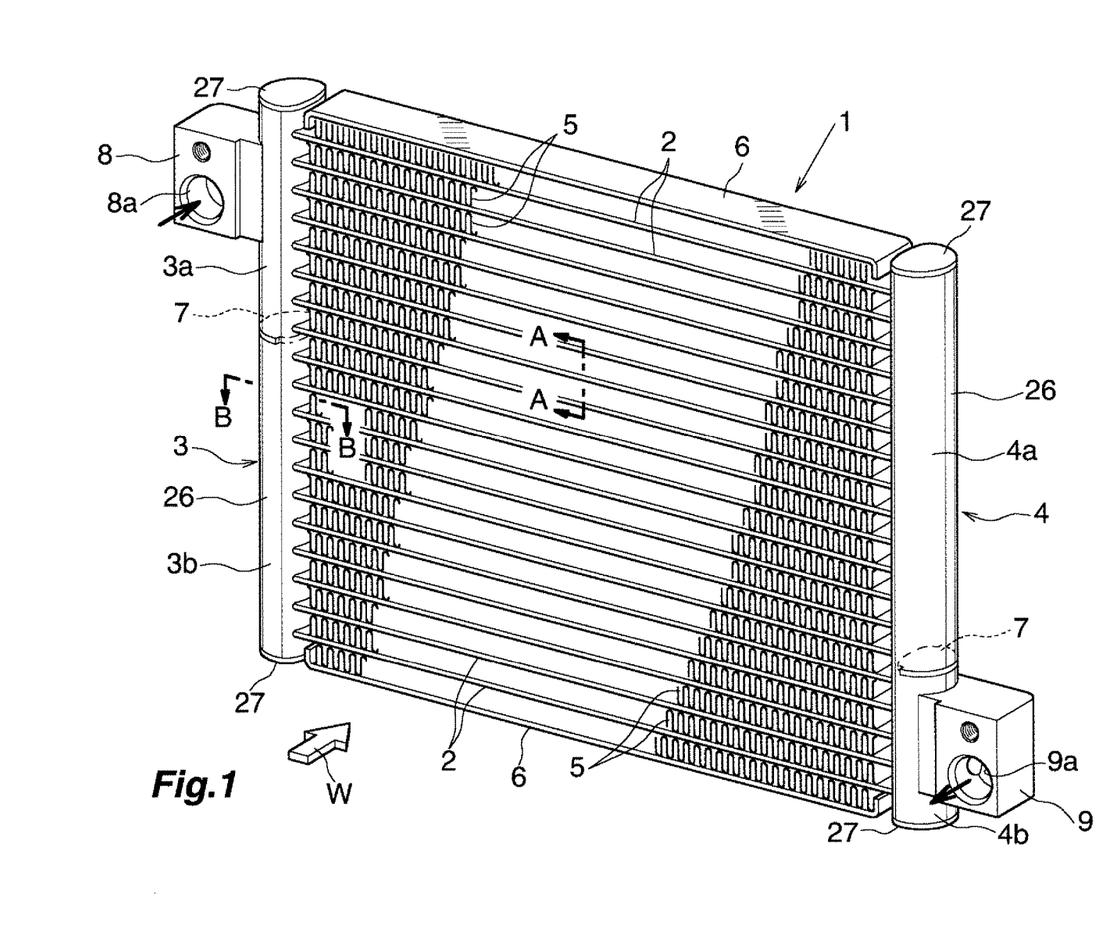
FIG. 1 is a perspective view showing the overall structure of a condenser for a car air conditioner to which a heat exchanger according to the present invention is applied.
Figure 2:
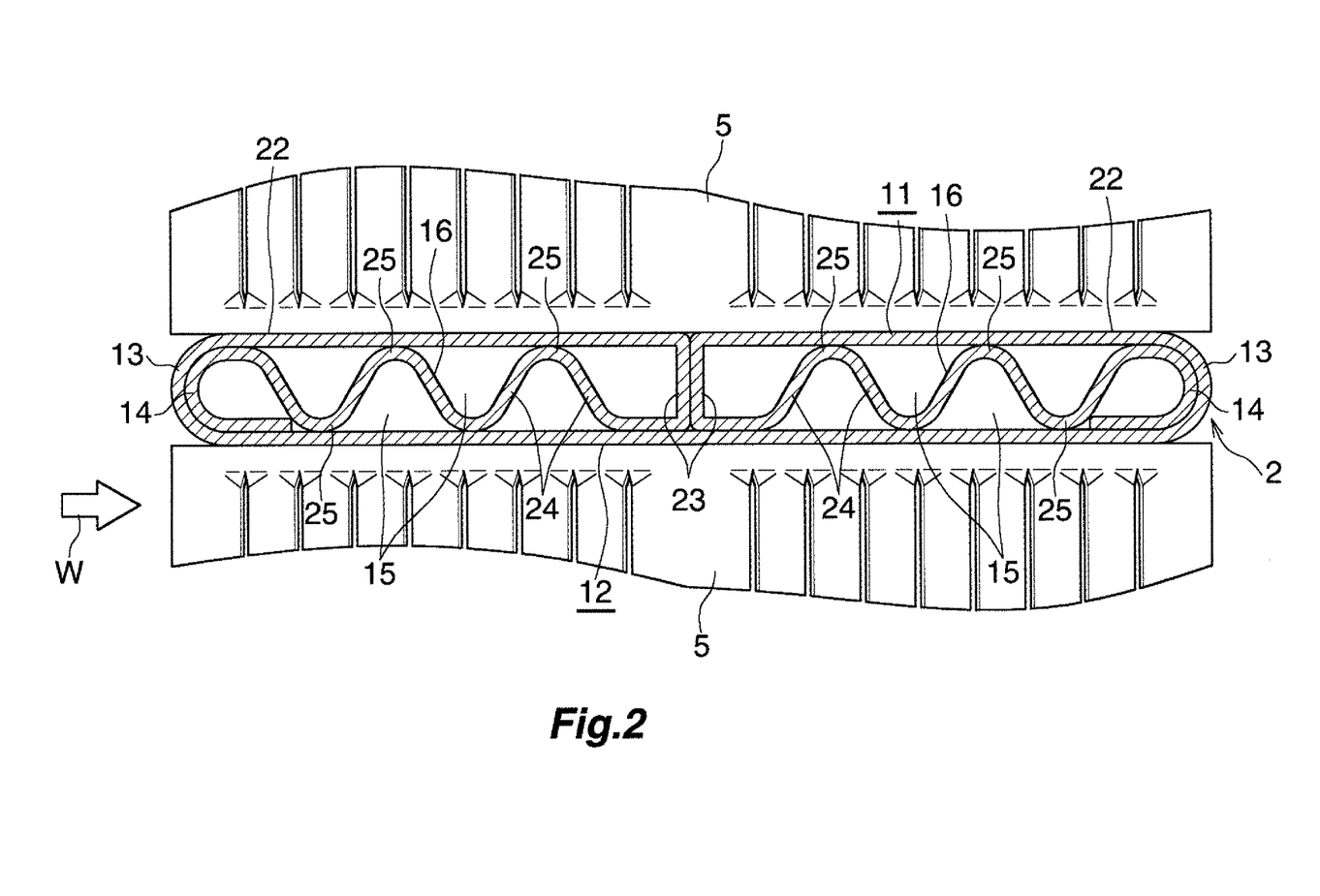
FIG. 2 is an enlarged cross-sectional view taken along line A-A of FIG. 1.
Figure 3:
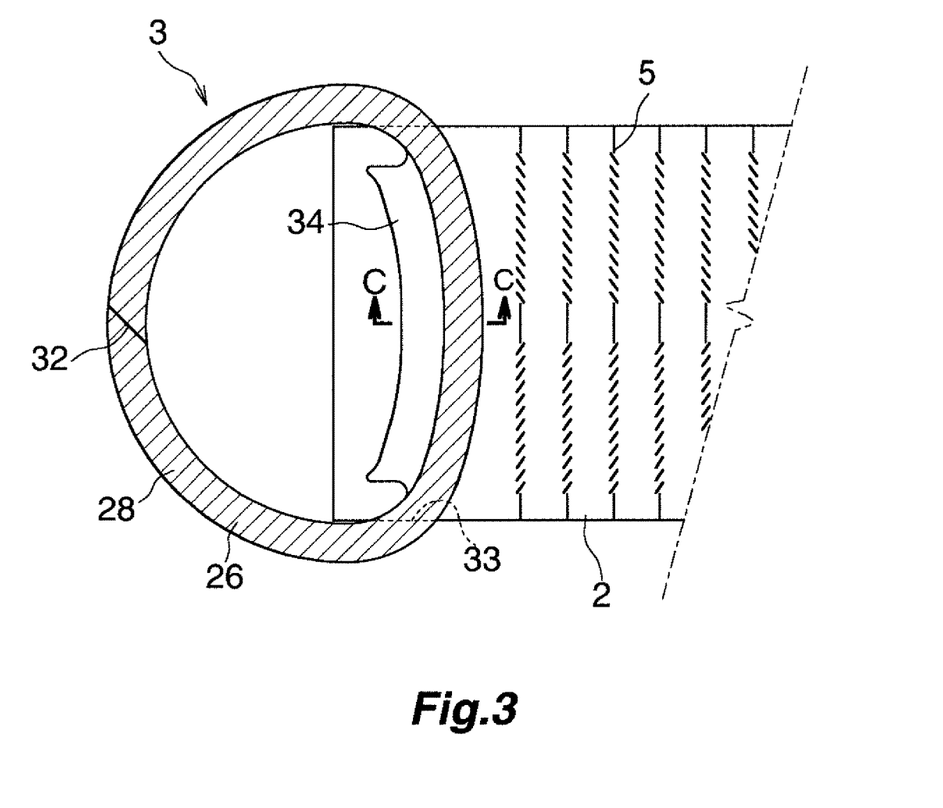
FIG. 3 is an enlarged cross-sectional view taken along line B-B of FIG. 1.
Figure 4:
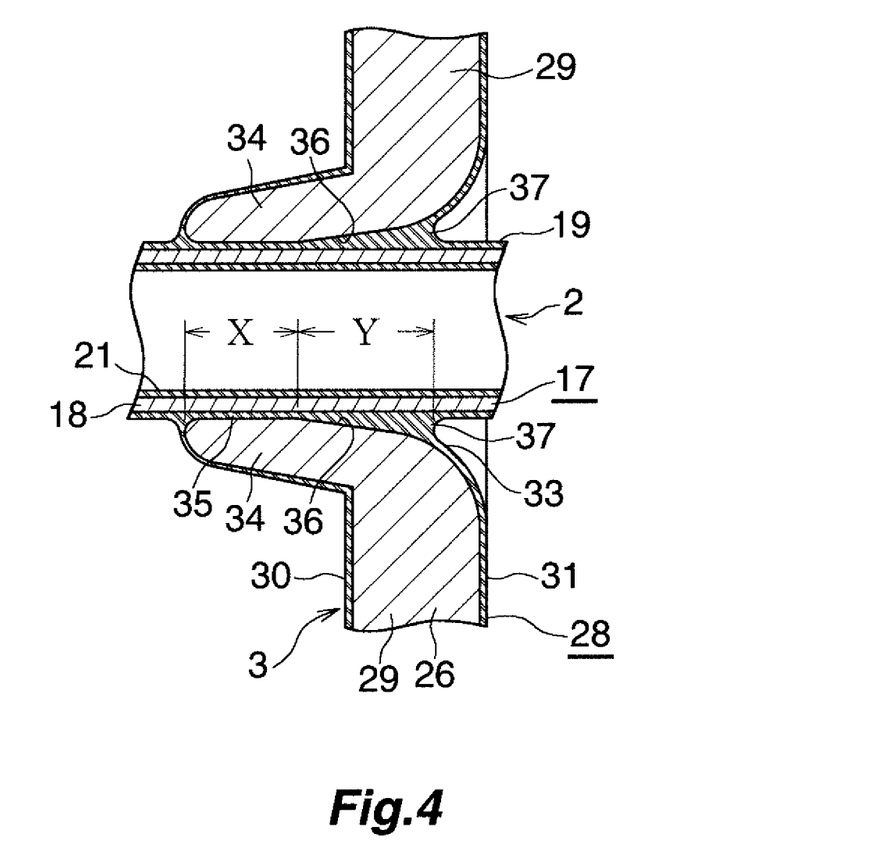
FIG. 4 is an enlarged cross-sectional view taken along line C-C of FIG. 3.
Figure 5:
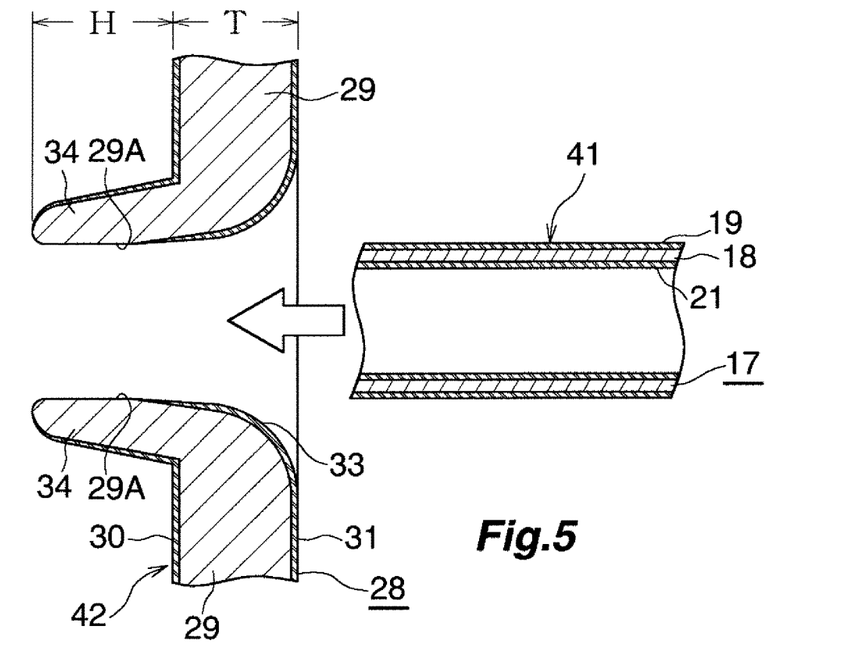
FIG. 5 is a view corresponding to FIG. 4 and showing a state before a heat exchange tube member is inserted into a tube insertion hole of a tank body member during manufacture of the condenser of FIG. 1.
Figure 6:
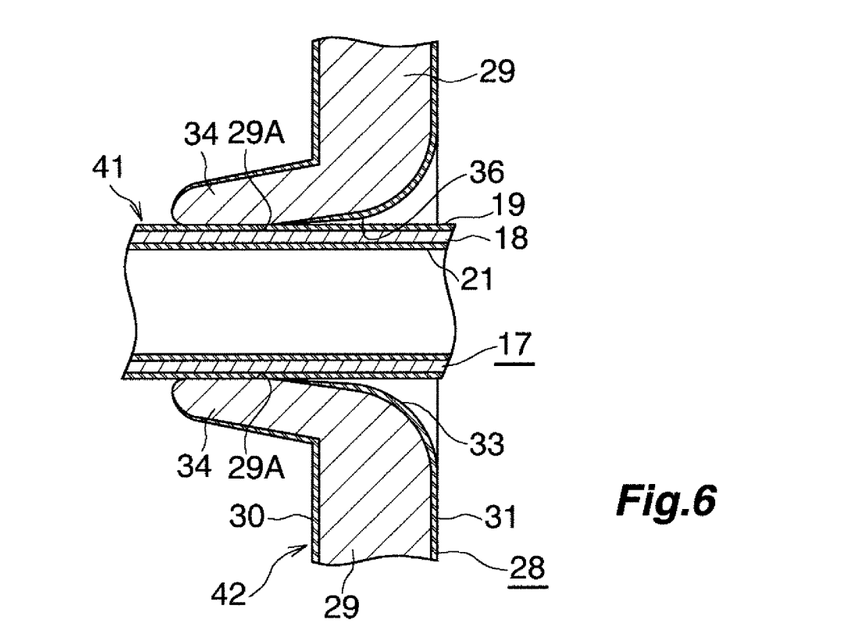
FIG. 6 is a view corresponding to FIG. 4 and showing a state after the heat exchange tube member is inserted into the tube insertion hole of the tank body member during manufacture of the condenser of FIG. 1.

FIG. 1 shows the overall structure of a condenser for a car air conditioner to which a heat exchanger according to the present invention is applied, and FIGS. 2 to 4 show the structure of a main portion of the condenser. FIGS. 5 and 6 show some steps of a method of manufacturing the condenser of FIG. 1.

Notably, in the following description, the upper, lower, left-hand, and right-hand sides of FIG. 1 will be referred to as "upper," "lower," "left," and "right," respectively.

As shown in FIG. 1, a condenser 1 for a car air conditioner includes a plurality of flat heat exchange tubes 2 formed of aluminum, a pair of header tanks 3 and 4 formed of aluminum, corrugated fins 5 formed of aluminum, and side plates 6 formed of aluminum. The heat exchange tubes 2 are disposed at predetermined intervals in the vertical direction (the thickness direction) in such a manner that their longitudinal directions coincide with the left-right direction and their width directions coincide with an air-passing direction. The header tanks 3 and 4 are disposed at a predetermined interval in the left-right direction in such a manner that their longitudinal directions coincide with the vertical direction (the direction in which the heat exchange tubes 2 are juxtaposed). Left and right end portions of the heat exchange tubes 2 are connected to the header tanks 3 and 4. The corrugated fins 5 are disposed between adjacent heat exchange tubes 2 and on the outer sides of the uppermost and lowermost heat exchange tubes 2, and are brazed to the corresponding heat exchange tubes 2. The side plates 6 are disposed on the outer sides of the uppermost and lowermost fins 5, and are brazed to the corresponding fins 5. Air flows in a direction indicated by an arrow W in FIGS. 1 and 2.

The left header tank 3 is divided by a partition member 7 into upper and lower header sections 3a and 3b, at a position higher than the center of the left header tank 3 in the height direction. The right header tank 4 is divided by another partition member 7 into upper and lower header sections 4a and 4b, at a position lower than the center of the right header tank 4 in the height direction. A fluid inlet (not shown) is formed at the upper header section 3a of the left header tank 3, and an aluminum inlet member 8 having a fluid inflow passage 8a communicating with the fluid inlet is brazed to the upper header section 3a. A fluid outlet (not shown) is formed at the lower header section 4b of the right header tank 4, and an aluminum outlet member 9 having a fluid outflow passage 9a communicating with the fluid outlet is brazed to the lower header section 4b. Refrigerant having flowed into the upper header section 3a of the left header tank 3 through the inlet member 8 flows rightward within the heat exchange tubes 2 located above the partition plate 7 of the left header tank 3, and flows into an upper portion of the upper header section 4a of the right header tank 4. The refrigerant then flows downward within the upper header section 4a, flows leftward within the heat exchange tubes 2 whose vertical positons are located between the partition plate 7 of the left header tank 3 and the partition plate 7 of the right header tank 4, and flows into an upper portion of the lower header section 3b of the left header tank 3. The refrigerant then flows downward within the lower header section 3b, flows rightward within the heat exchange tubes 2 located below the partition plate 7 of the right header tank 4, and flows into the lower header section 4b of the right header tank 4. The refrigerant then flows to the outside of the condenser 1 through the outlet member 9.

As shown in FIG. 2, each flat heat exchange tube 2 has a pair of flat walls 11 and 12, two side walls 13, two reinforcing members 14, and two wavy partition members 16. The flat walls 11 and 12 are spaced from each other in the vertical direction and face each other. The side walls 13 are provided between edge portions of the two flat walls 11 and 12, which edge portions are located on opposite sides in the width direction of the tube. The reinforcing members 14 are provided inward of the two side walls 13. The partition members 16 are provided in the flat heat exchange tube 2 and divide the internal space into a plurality of refrigerant passages 15 extending in the length direction of the tube. The entire heat exchange tube 2 is formed from a first aluminum brazing sheet 17 (a first brazing sheet) which is composed of a core material 18, a first brazing material 19 covering the outer surface of the core material 18, and a second brazing material 21 covering the inner surface of the core material 18 (see FIG. 4).

The entirety of the lower flat wall 12 of the flat heat exchange tube 2 is formed as a single member, and the upper flat wall 11 thereof is composed of two divisional walls 22 juxtaposed in the tube width direction. The side walls 13 which extend in the height direction of the tube (the vertical direction) and have an arcuate transverse cross section projecting outward in the tube width direction are provided between edge portions of the lower flat wall 12 located on the opposite sides in the tube width direction and side edge portions of the two divisional walls 22 located on the outer side in the tube width direction. Projection walls 23 are integrally formed on edge portions of the two divisional walls 22 of the upper flat wall 11 of the flat heat exchange tube 2, which edge portions are located on the inner side in the tube width direction. The projection walls 23 project toward the lower flat wall 11, and their distal ends are in contact with the lower flat wall 11. In this state, the projection walls 23 are brazed to the lower flat wall 11. The projection walls 23 are brazed to each other. The partition members 16 are integrally formed at the distal ends of the projection walls 23 such that the partition members 16 extend outward in the tube width direction.

Each of the partition members 16 is composed of a plurality of partition walls 24 which extend in the tube length direction (in the left-right direction), are juxtaposed in the tube width direction, and each separate adjacent refrigerant passages 15 from each other; and connection portions 25 which alternately connect the upper and lower ends of the partition walls 24 located adjacent to each other in the tube width direction, which are brazed to the inner surfaces of the two flat walls 11 and 12, and which have an arcuate transverse cross section. The upper and lower ends of the partition walls 24 are located on opposite sides in the tube height direction (the vertical direction). The reinforcing member 14 is integrally formed such that it is connected to one end (in the tube height direction) of the partition wall 24 at the outer end of each partition member 16 in the tube width direction. In the present embodiment, the upper end (one end in the tube height direction) of the reinforcing member 14 is connected to the upper end (one end in the tube height direction) of the partition wall 24 at the outer end in the tube width direction.

Each of the left and right header tanks 3 and 4 is composed of a tank body 26 and aluminum closing members 27 which are brazed to opposite ends of the tank body 26 so as to close openings at the opposite ends of the tank body 26. The tank body 26 is formed by bending, into a tubular shape, an aluminum brazing sheet having a brazing material layer on each of opposite sides thereof and brazing opposite side edges of the sheet which are butted against each other.

As shown in FIGS. 3 and 4, each of the tank bodies 26 of the two header tanks 3 and 4 is formed from a second aluminum brazing sheet 28 (a second brazing sheet) composed of a core material 29; a third brazing material 31 which covers the outer surface of the core material 29 and which is lower in flowability than the first brazing material 19 of the first aluminum brazing sheet 17 used to form the heat exchange tubes 2; and a fourth brazing material 30 which covers the inner surface of the core material 29 and which is lower in flowability than the first brazing material 19 of the first aluminum brazing sheet 17 used to form the heat exchange tubes 2. The second aluminum brazing sheet 28 is bent into a tubular shape such that the third brazing material 31 is located on the outer surface side, and opposite side edge portions of the sheet 28 partially overlapping each other are brazed together. As a result, the tank body 26 is formed. The outer circumferential surfaces of the tank bodies 26 of the two header tanks 3 and 4 are covered with the third brazing material 31, and the inner circumferential surfaces thereof are covered with the fourth brazing material 30. Each tank body 26 has a plurality of tube insertion holes 33 formed on the side opposite a brazed portion 32 of the second aluminum brazing sheet 28 formed into a tubular shape. The brazed portion 32 is formed as a result of brazing of the opposite side edges of the sheet butted against each other. The tube insertion holes 33 are formed at predetermined intervals in the vertical direction in such a manner that the tube insertion holes 33 are elongated in the air-flow direction.

Protrusion portions 34 protruding toward the inner space of the tank body 26 are integrally formed along edges of each tube insertion hole 33 of the tank body 26, which edges are located on opposite sides in the width direction (in the vertical direction) and which face each other. An end portion of each heat exchange tube 2 is inserted into the corresponding tube insertion hole 33 and is brazed to a portion of the tank body 26 around the tube insertion hole 33 and to the corresponding protrusion portions 34. Each of the protrusion portions 34 has a projection height equal to or greater than the thickness of the circumferential wall of the tank body 26, and has a thickness which decreases gradually toward the projecting end thereof. In a region of a surface of each protrusion portion 34 facing the corresponding heat exchange tube 2, the region having a predetermined width as measured from the projecting end, the core material 29 of the second aluminum brazing sheet 28 is brazed to the core material of the first brazing sheet 17 by means of the first brazing material 19 covering the outer surface of the first brazing sheet 17. The width of a brazed portion 35 of the surface of each protrusion portion 34 facing the corresponding heat exchange tube 2, which brazed portion is formed as a result of brazing to the heat exchange tube 2 by means of the first brazing material 19, is equal to or greater than the thickness of the circumferential wall of the tank body 26.

In a region of the surface of each protrusion portion 34 facing the heat exchange tube 2, the region remaining after exclusion of the brazed portion 35, the distance between the core material 29 of the second brazing sheet 28 and the core material 18 of the first brazing sheet 17 gradually increases from the side closer to the brazed portion 35 toward the outside of the tank body 26. As a result, a brazing material accumulation space 36 is formed between the core materials 18 and 29 of the two brazing sheets 17 and 28. A fillet 37 formed of a mixture of the first brazing material 19 of the first brazing sheet 17 and the third brazing material 31 of the second brazing sheet 28 is formed in the brazing material accumulation space 36. Portions of the core materials 18 and 29 of the two brazing sheets 17 and 28 which form the brazing material accumulation space 36 are brazed together through the fillet 37.

It is preferred that a relation of Y/X=0.40 to 1.40 is satisfied, where X is the length (mm) of the brazed portion 35 of the surface of each protrusion portion 34 facing the corresponding heat exchange tube 2, the length being measured in the longitudinal direction of the heat exchange tube 2, and Y is the length (mm) of the fillet 37 formed in the brazing material accumulation space 36 as measured in the longitudinal direction of the heat exchange tube 2. In the case where Y/X<0.40, there arises a possibility that the fillet 37 becomes insufficient in amount, and a brazing failure occurs. In the case where Y/X>1.40, a flow suppressing effect attained by the joint-like shape becomes insufficient, and there arises a possibility that the third brazing material 31 of the tank body 26 flows toward the heat exchange tubes 2 and erosion occurs on the heat exchange tubes 2.

The condenser 1 is manufactured by a method which will be described below.

The first aluminum brazing sheet 17 composed of the core material 18 formed of aluminum, the first brazing material 19 formed of aluminum and covering one surface of the core material 18, and the second brazing material 21 formed of aluminum and covering the other surface of the core material 18 is bent in such a manner that the first brazing material 19 is located on the outer surface side. As a result, a heat exchange tube member 41 which has the same shape as the heat exchange tube 2 and in which portions to be joined have not yet been brazed is formed (see FIG. 5).

Also, the tube insertion holes 33 are formed in a central portion (in the width direction) of the second aluminum brazing sheet 28 composed of the core material 29 formed of aluminum, the third brazing material 31 covering one surface of the core material 29, and the fourth brazing material 30 covering the other surface of the core material 29, and the protrusion portions 34 are formed. The projection height H of each protrusion portion 34 is rendered equal to or greater than the thickness T of the circumferential wall of the tank body 26, and the thickness of each protrusion portion 34 is decreased toward the projecting end thereof. Further, in the region of the surface of each protrusion portion 34 facing the corresponding heat exchange tube 2, the region having a predetermined width as measured from the projecting end, the core material 29 of the second brazing sheet 28 is exposed, whereby an exposed portion 29A is provided. The second brazing sheet 28 is then bent in a tubular shape in such a manner that the third brazing material 31 is located on the outer surface side. As a result, a tank body member 42 which has the same shape as the tank body 26 and in which the opposite side edges butted against each other have not yet been brazed is formed (see FIG. 5).

Subsequently, the tank body members 42 and the closing members 27 are combined, and opposite end portions of the heat exchange tube members 41 are inserted into the tube insertion holes 33 of the corresponding tank body members 42. At that time, the exposed portion 29A of each protrusion portion 34 of the tank body member 42 where the core material 29 is exposed is brought into contact with the outer surface of the corresponding heat exchange tube member 41, and in the region remaining after exclusion of the exposed portion 29A, the distance between the surface of each protrusion portion 34 facing the heat exchange tube member 41 and the outer surface of the heat exchange tube member 41 is increased gradually from the side closer to the exposed portion 29A toward the outside of the tank body member 42, whereby the brazing material accumulation space 36 is formed (see FIG. 6).

After that, the assembly of the tank body members 42, the partition members 7, the closing members 27, and the heat exchange tube members 41 is heated to a predetermined temperature, whereby the to-be-joined portions of each heat exchange tube member 41 are brazed together to form a heat exchange tube 2, and the to-be-joined portions of each tank body member 42 are brazed together to form a tank body 26. The tank body 26, the corresponding partition member 7, and the corresponding closing members 27 are brazed together to form each of the header tanks 3 and 4. Simultaneously with formation of the heat exchange tubes 2 and formation of the header tanks 3 and 4, the exposed portion 29A of each protrusion portion 34 is brazed to the outwardly facing surface of the core material 18 of the first brazing sheet 17 which forms the heat exchange tube 2 by means of the first brazing material 19 of the first brazing sheet 17. Further, the fillet 37 formed of a mixture of the first brazing material 19 of the first brazing sheet 17 and the third brazing material 31 of the second brazing sheet 28 is formed in the brazing material accumulation space 36. Portions of the core materials 18 and 29 of the two brazing sheets 17 and 28 which form the brazing material accumulation space 36 are brazed together through the fillet 37. Further, simultaneously with formation of the heat exchange tubes 2 and formation of the header tanks 3 and 4, the heat exchange tubes 2 and the corrugated fins 5 are brazed together, the corrugated fins 5 and the side plates 6 are brazed together, the header tank 3 and the inlet member 8 are brazed together, and the header tank 4 and the outlet member 9 are brazed together. In this manner, the condenser 1 is manufactured.

The first brazing sheet 17 which forms each heat exchange tube 2 is preferably composed of the core material 18 formed of a 3000 series Al alloy; the first brazing material 19 which is formed of an Al alloy containing Si in an amount of 6.8 to 8.2 mass % and Zn in an amount of 1.5 to 2.5 mass %, the balance being Al and unavoidable impurities, and which covers one surface of the core material 18; and the second brazing material 21 which is formed of an Al alloy containing Si in an amount of 9.0 to 11.0 mass %, the balance being Al and unavoidable impurities, and which covers the other surface of the core material 18, wherein the cladding ratio of the first brazing material 19 is 14 to 18%, and the cladding ratio of the second brazing material 21 is 8 to 12%.

The reasons why the Si content of the first brazing material 19 of the first brazing sheet 17 is set to 6.8 to 8.2 mass % are as follows. When the Si content is less than 6.8 mass %, there arises a possibility that the flowability at the time of melting becomes insufficient, and a sufficient fillet is not formed at the time of brazing of the heat exchange tubes 2 and the corrugated fins 5. When the Si content exceeds 8.2 mass %, there arises a possibility that the flowability at the time of melting becomes excessively high, and the first brazing material 19 causes erosion of the heat exchange tubes 2. The reasons why the Zn content of the first brazing material 19 is set to 1.5 to 2.5 mass % are as follows. When the Zn content is less than 1.5 mass %, there arises a possibility that since a sufficient zinc diffusion layer cannot be formed on the outer surface of each heat exchange tube 2, the action of the zinc diffusion layer as a galvanic anode (sacrificial anode) is not sufficient, and a sufficient corrosion prevention effect cannot be obtained. When the Zn content exceeds 2.5 mass %, the thickness of the zinc diffusion layer becomes excessively large, and the strength of the heat exchanges tube 2 after sacrificial corrosion becomes insufficient. The reasons why the Si content of the second brazing material 21 of the first brazing sheet 17 is set to 9.0 to 11.0 mass % are as follows. When the Si content is less than 9.0 mass %, there arises a possibility that the flowability at the time of melting becomes insufficient, and a sufficient fillet is not formed at the time of brazing of the interior of each heat exchange tube 2. When the Si content exceeds 11.0 mass %, there arises a possibility that the flowability at the time of melting becomes excessively high, and the second brazing material 21 causes erosion of the heat exchange tubes 2. Further, the reasons why the cladding ratio of the first brazing material 19 of the first brazing sheet 17 is set to 14 to 18% are as follows. When the cladding ratio is less than 14%, there arises a possibility that the brazing material necessary for brazing cannot be secured sufficiently. When the cladding ratio exceeds 18%, there arises a possibility that the excessive brazing material causes erosion of the heat exchange tubes 2. The reasons why the cladding ratio of the second brazing material 21 of the first brazing sheet 17 is set to 8 to 12% are as follows. When the cladding ratio is less than 8%, there arises a possibility that the brazing material necessary for brazing cannot be secured sufficiently. When the cladding ratio exceeds 12%, there arises a possibility that the excessive brazing material causes erosion of the heat exchange tubes 2.

The second brazing sheet 28 which forms each tank body 26 is preferably composed of the core material 29 formed of a 3000 series Al alloy; the third brazing material 31 which is formed of an Al alloy containing Si in an amount of 4.5 to 5.5 mass % as an element affecting the flowability of the molten brazing material and which covers one surface of the core material 29; and the fourth brazing material 30 which is formed of an Al alloy containing Si in an amount of 4.5 to 5.5 mass % as an element affecting the flowability of the molten brazing material and which covers the other surface of the core material 29, wherein the cladding ratios of the third brazing material 31 and the fourth brazing material 30 are 4.5 to 8.5%.

The reasons why the Si contents of the third brazing material 31 and the fourth brazing material 30 of the second brazing sheet 28 are set to 4.5 to 5.5 mass % are as follows. When the Si contents are less than 4.5 mass %, the flowability of the molten third brazing material 31 is insufficient. When the Si contents exceed 5.5 mass %, the flowability of the molten third brazing material 31 becomes approximately the same as the flowability of the molten first brazing material 19 of the first brazing sheet 17. Further, the reasons why the cladding ratio of the third brazing material 31 of the second brazing sheet 28 is set to 4.5 to 8.5% are as follows. When the cladding ratio is less than 4.5%, there arises a possibility that the brazing material necessary for brazing the tank body 26 and an external component cannot be secured sufficiently. When the cladding ratio exceeds 8.5%, there arises a possibility that the excessive brazing material causes erosion of the heat exchange tubes 2. The reasons why the cladding ratio of the fourth brazing material 30 of the second brazing sheet 28 is set to 4.5 to 8.5% are as follows. When the cladding ratio is less than 4.5%, there arises a possibility that the brazing material necessary for brazing the butted portions of the tank body 26 cannot be secured sufficiently. When the cladding ratio exceeds 8.5%, there arises a possibility that the excessive brazing material causes erosion of the heat exchange tubes 2. Notably, the third brazing material 31 and the fourth brazing material 30 of the second brazing sheet 28 may contain different types of elopements or contain the same element in different amounts in consideration of corrosion resistance, strength, etc., so long as the amount of Si which affects flowability falls with the range of 4.5 to 5.5 mass %.

The 3000 series Al alloy used for the first and second brazing sheets 17 and 28 means an Al alloy whose strength is increased through addition of Mn without lowing the corrosion resistance and workability of pure aluminum.

Also, the heating of the assembly of the tank body members 42, the partition members 7, the closing members 27, and the heat exchange tube members 41 is preferably carried out at 585 to 600° C. in a nitrogen gas atmosphere.

Next, a specific example of the present invention will be described together with a comparative example.

EXAMPLE

There was prepared the first aluminum brazing sheet 17 having a thickness of 0.2 mm and composed of the core material 18 containing Si in an amount of 0.09 mass %, Fe in an amount of 0.09 mass %, Cu in an amount of 0.38 mass %, Mn in an amount of 0.78 mass %, and Ti in an amount of 0.09 mass %, the balance being Al and unavoidable impurities; the first brazing material 19 containing Si in an amount of 7.45 mass %, Fe in an amount of 0.25 mass %, Mg in an amount of 0.01 mass %, Zn in an amount of 2.04 mass %, and Ti in an amount of 0.01 mass %, the balance being Al and unavoidable impurities, and covering one surface of the core material 18; and the second brazing material 21 containing Si in an amount of 9.60 mass %, Fe in an amount of 0.28 mass %, Cu in an amount of 0.04 mass %, and Ti in an amount of 0.02 mass %, the balance being Al and unavoidable impurities, and covering the other surface of the core material 18. The first aluminum brazing sheet 17 was bent in such a manner that the first brazing material 19 was located on the outer surface side. As a result, the heat exchange tube member 41 which had the same shape as the heat exchange tube 2 and in which portions to be joined had not yet been brazed was formed. The cladding ratio of the first brazing material 19 of the first aluminum brazing sheet 17 is 16%, and the cladding ratio of the second brazing material 21 of the first aluminum brazing sheet 17 is 10%. Notably, each of the core material 18, the first brazing material 19, and the second brazing material 21 contains unavoidable impurity elements in an amount of 0.05 mass % or less, and the total amount of unavoidable impurity elements contained is 0.15 mass %.

Also, there was prepared the second aluminum brazing sheet 28 having a thickness of 1.2 mm and composed of the core material 29 containing Si in an amount of 0.11 mass %, Fe in an amount of 0.10 mass %, Cu in an amount of 0.11 mass %, Mn in an amount of 1.12 mass %, Mg in an amount of 0.01 mass %, Zn in an amount of 0.51 mass %, and Ti in an amount of 0.10 mass %, the balance being Al and unavoidable impurities; the third brazing material 31 containing Si in an amount of 5.0 mass %, and Fe in an amount of 0.20 mass %, the balance being Al and unavoidable impurities, and covering one surface of the core material 29; and the fourth brazing material 30 containing Si in an amount of 5.0 mass %, Fe in an amount of 0.39 mass %, and Cu in an amount of 0.59 mass %, the balance being Al and unavoidable impurities, and covering the other surface of the core material 29. The second aluminum brazing sheet 28 was bent into a tubular shape such that the third brazing material 31 was located on the outer surface side. As a result, the tank body member 42 which had the same shape as the tank body 26 and in which portions to be joined had not yet been brazed was formed. The cladding ratio of the third brazing material 31 of the second aluminum brazing sheet 28 is 5.9%, and the cladding ratio of the fourth brazing material 30 of the second aluminum brazing sheet 28 is 6.8%. Notably, each of the core material 29, the third brazing material 31, and the fourth brazing material 30 contains unavoidable impurity elements in an amount of 0.05 mass % or less, and the total amount of unavoidable impurity elements contained is 0.15 mass %.

After that, the condenser 1 was manufactured in the same manner as the above-described method.

Erosion causing corrosion of the core material did not occur on the heat exchange tubes of the manufactured condenser. Also, no brazing failure occurred between each heat exchange tube and a portion of each tank body around the corresponding tube insertion hole or the corresponding protrusion portions.

COMPARATIVE EXAMPLE

There was prepared the first aluminum brazing sheet having a thickness of 0.2 mm and composed of a core material containing Si in an amount of 0.10 mass %, Fe in an amount of 0.12 mass %, Cu in an amount of 0.35 mass %, Mn in an amount of 0.73 mass %, Zn in an amount of 0.01 mass %, and Ti in an amount of 0.09 mass %, the balance being Al and unavoidable impurities; a first brazing material containing Si in an amount of 7.65 mass %, Fe in an amount of 0.16 mass %, Cu in an amount of 0.01 mass %, and Zn in an amount of 1.93 mass %, the balance being Al and unavoidable impurities, and covering one surface of the core material; and a second brazing material containing Si in an amount of 9.74 mass %, and Fe in an amount of 0.33 mass %, the balance being Al and unavoidable impurities, and covering the other surface of the core material. The first aluminum brazing sheet was bent in such a manner that the first brazing material was located on the outer surface side. As a result, a heat exchange tube member which had the same shape as the heat exchange tube 2 and in which portions to be joined had not yet been brazed was formed. The cladding ratio of the first brazing material of the first aluminum brazing sheet is 5%, and the cladding ratio of the second brazing material of the first aluminum brazing sheet is 6%. Notably, each of the core material, the first brazing material, and the second brazing material contains unavoidable impurity elements in an amount of 0.05 mass % or less, and the total amount of unavoidable impurity elements contained is 0.15 mass %.

Also, there was prepared a second aluminum brazing sheet having a thickness of 1.2 mm and composed of a core material containing Si in an amount of 0.20 mass %, Fe in an amount of 0.62 mass %, Cu in an amount of 0.15 mass %, Mn in an amount of 1.08 mass %, and Zn in an amount of 0.01 mass %, the balance being Al and unavoidable impurities; a third brazing material containing Si in an amount of 8.66 mass %, Fe in an amount of 0.45 mass %, and Zn in an amount of 1.10 mass %, the balance being Al and unavoidable impurities, and covering one surface of the core material; and a fourth brazing material containing Si in an amount of 8.60 mass %, Fe in an amount of 0.43 mass %, and Cu in an amount of 0.02 mass %, the balance being Al and unavoidable impurities, and covering the other surface of the core material. The second aluminum brazing sheet was bent into a tubular shape such that the third brazing material was located on the outer surface side. As a result, a tank body member which had the same shape as the tank body and in which portions to be joined had not yet been brazed was formed. The cladding ratio of the third brazing material of the second aluminum brazing sheet is 5%, and the cladding ratio of the fourth brazing material of the second aluminum brazing sheet is 6%. Notably, each of the core material, the third brazing material, and the fourth brazing material contains unavoidable impurity elements in an amount of 0.05 mass % or less, and the total amount of unavoidable impurity elements contained is 0.15 mass %.

After that, a condenser was manufactured in the same manner as in the above-described embodiment.

Erosion causing corrosion of the core material occurred on the heat exchange tubes of the manufactured condenser. Also, no brazing failure occurred between each heat exchange tube and a portion of each tank body around the corresponding tube insertion hole or the corresponding protrusion portions.

The present invention comprises the following modes.

1) A heat exchanger comprising:

a plurality of flat heat exchange tubes disposed at predetermined intervals in a thickness direction of the tubes in such a manner that their longitudinal directions coincide with one another and their width directions coincide with an air-flow direction; and two header tanks disposed at opposite longitudinal ends of the heat exchange tubes in such a manner that their longitudinal directions coincide with a direction in which the heat exchange tubes are juxtaposed, opposite end portions of the heat exchange tubes being connected to the corresponding header tanks, each of the header tanks being composed of a tubular tank body which has openings at opposite ends thereof, and closing members which are brazed to the opposite ends of the tank body so as to close the openings, the tank body having a plurality of tube insertion holes which are formed at predetermined intervals in a longitudinal direction of the tank body and each of which is an elongated hole whose longitudinal direction coincides with the air-flow direction, protrusion portions which project toward an inner space of the tank body being formed along edges of each tube insertion hole which are located on opposite sides in a width direction of the tube insertion hole and which face each other, and an end portion of each heat exchange tube being inserted into the corresponding tube insertion hole and being brazed to a portion of the tank body around the tube insertion hole and the protrusion portions, wherein each heat exchange tube is formed of a first brazing sheet having a core material and a brazing material covering an outer surface of the core material;

the tank body of each header tank is formed of a second brazing sheet having a core material and a brazing material covering an outer surface of the core material and being lower in flowability than the brazing material of the first brazing sheet used to form the heat exchange tube;

each of the protrusion portions has a projection height equal to or greater than a thickness of a circumferential wall of the tank body and has a thickness which decreases gradually toward a projecting end thereof;

in a region of a surface of each protrusion portion facing the corresponding heat exchange tube, the region having a predetermined width as measured from the projecting end, the core material of the second brazing sheet is brazed to the core material of the first brazing sheet by means of the brazing material covering the outer surface of the first brazing sheet;

in a region of the surface of each protrusion portion facing the corresponding heat exchange tube, the region remaining after exclusion of the brazed portion, a distance between the core material of the second brazing sheet and the core material of the first brazing sheet increases gradually from a side closer to the brazed portion toward the outside of the tank body, and a brazing material accumulation space is formed between the core materials of the two brazing sheets; and portions of the core materials of the two brazing sheets which form the brazing material accumulation space are brazed to each other by means of a fillet formed in the brazing material accumulation space, the fillet being formed of a mixture of the brazing material covering the outer surface of the first brazing sheet and the brazing material covering the outer surface of the second brazing sheet.

2) A heat exchanger according to par. 1), wherein a relation of Y/X=0.40 to 1.40 is satisfied, where X is a length (mm) of the brazed portion of the surface of each protrusion portion facing the corresponding heat exchange tube, the length being measured in the longitudinal direction of the heat exchange tube, and Y is a length (mm) of the fillet formed in the brazing material accumulation space as measured in the longitudinal direction of the heat exchange tube.

3) A method of manufacturing a heat exchanger according to par. 1), comprising:

forming each of flat, hollow heat exchange tube members through use of a first brazing sheet having a core material and a brazing material covering one surface of the core material, each of the heat exchange tube members having an outer surface covered with the brazing material and having potions to be joined together;

forming each of tubular tank body members through use of a second brazing sheet having a core material and a brazing material covering one surface of the core material and being lower in flowability than the brazing material of the first brazing sheet used to form the heat exchange tube, each of the tank body members having an outer surface covered with the brazing material, having potions to be joined together, and having a plurality of tube insertion holes and protrusion portions;

rendering the projection height of each protrusion portion of each tank body member equal to or greater than the thickness of the circumferential wall of the tank body, gradually decreasing the thickness of each protrusion portion toward the projecting end thereof, and exposing the core material of the second brazing sheet in a region of the surface of each protrusion portion facing the corresponding heat exchange tube, the region having a predetermined width as measured from the projecting end;

combining the tank body members and the closing members, and inserting opposite end portions of the heat exchange tube members into the tube insertion holes of the corresponding tank body members;

bringing an exposed portion of each protrusion portion of each tank body member where the core material is exposed into contact with the outer surface of the corresponding heat exchange tube member, and, in a region of the protrusion portion remaining after exclusion of the exposed portion, gradually increasing the distance between the surface of the protrusion portion facing the heat exchange tube member and the outer surface of the heat exchange tube member from the side closer to the exposed portion toward the outside of the tank body member, to thereby form a brazing material accumulation space;

heating an assembly of the tank body members, the closing members, and the heat exchange tube members to a predetermined temperature so as to braze the to-be-joined portions of each heat exchange tube member to thereby form each of the heat exchange tubes, braze the to-be-joined portions of each tank body member to thereby form each of the tank bodies, braze each tank body and the corresponding closing members to thereby form each of the header tanks; and simultaneously with formation of the heat exchange tubes and formation of the header tanks, brazing the exposed portion of each protrusion portion to an outward facing surface of the core material of the first brazing sheet forming the corresponding heat exchange tube member by means of the brazing material of the first brazing sheet covering the outer surface of the heat exchange tube member, and forming in the brazing material accumulation space a fillet formed of a mixture of the brazing material of the first brazing sheet covering the outer surface of the heat exchange tube member and the brazing material of the second brazing sheet covering the outer surface of the tank body member, to thereby brazing together portions of the core materials of the two brazing sheets which form the brazing material accumulation space through the fillet.

4) A method of manufacturing a heat exchanger according to par. 3), wherein the first brazing sheet used to form each heat exchange tube member has a core material which is formed of a 3000 series Al alloy, and a brazing material which is formed of an Al alloy containing Si in an amount of 6.8 to 8.2 mass % and Zn in an amount of 1.5 to 2.5 mass %, the balance being Al and unavoidable impurities, and which covers one surface of the core material, the brazing material of the first brazing sheet having a cladding ratio of 14 to 18%;

the second brazing sheet used to form each tank body member has a core material which is formed of a 3000 series Al alloy, and a brazing material which is formed of an Al alloy containing Si in an amount of 4.5 to 5.5 mass % as an element affecting the flowability of the molten brazing material and which covers one surface of the core material, the brazing material of the second brazing sheet having a cladding ratio of 4.5 to 8.5%; and the heating of the assembly of the tank body members, the closing members, and the heat exchange tube members is performed at 585 to 600° C. in a nitrogen gas atmosphere.

In the manufacturing method of par. 4), the 3000 series Al alloy means an Al alloy whose strength is increased through addition of Mn without lowing the corrosion resistance and workability of pure aluminum.

According to the heat exchanger of par. 1) or 2), each heat exchange tube is formed of a first brazing sheet having a core material and a brazing material covering an outer surface of the core material, and the tank body of each header tank is formed of a second brazing sheet having a core material and a brazing material covering an outer surface of the core material and being lower in flowability than the brazing material of the first brazing sheet used to form the heat exchange tube. Since the heat capacity of each heat exchange tube member which forms each heat exchange tube is smaller than that of each tank body member which forms the tank body of each header tank, the brazing material on the heat exchange tube member flows due to heating at the time of manufacture of the heat exchanger. Even in such a case, the molten brazing material on the tank body of each header tank is prevented from flowing toward each heat exchange tube, which flow is induced by the molten brazing material on the heat exchange tube. As a result, erosion which causes corrosion of the core material is prevented from occurring on the heat exchange tubes.

In addition, each of the protrusion portions has a projection height equal to or greater than the thickness of the circumferential wall of the tank body and has a thickness which decreases gradually toward the projecting end thereof; in a region of the surface of each protrusion portion facing the corresponding heat exchange tube, the region having a predetermined width as measured from the projecting end, the core material of the second brazing sheet is brazed to the core material of the first brazing sheet by means of the brazing material covering the outer surface of the first brazing sheet; in a region of the surface of each protrusion portion facing the corresponding heat exchange tube, the region remaining after exclusion of the brazed portion, the distance between the core material of the second brazing sheet and the core material of the first brazing sheet increases gradually from the brazed portion side toward the outside of the tank body, and a brazing material accumulation space is formed between the core materials of the two brazing sheets; and portions of the core materials of the two brazing sheets which form the brazing material accumulation space are brazed to each other by means of a fillet formed in the brazing material accumulation space, the fillet being formed of a mixture of the brazing material covering the outer surface of the first brazing sheet and the brazing material covering the outer surface of the second brazing sheet. Therefore, even in the case where the brazing material on the tank body of each header tank is lower in flowability than the brazing material on each heat exchange tube, it is possible to suppress occurrence of a brazing failure between each heat exchange tube and a portion of the corresponding tank body around the corresponding tube insertion hole or between each heat exchange tube and the corresponding protrusion portions.

According to the manufacturing method of par. 3), the assembly of the tank body members, the closing members, and the heat exchange tube members is heated to a predetermined temperature, whereby the to-be-joined portions of each heat exchange tube member are brazed together to form each of the heat exchange tubes, the to-be-joined portions of each tank body member are brazed together to form each of the tank bodies, and each tank body and the corresponding closing members are brazed together to form each of the header tanks. At that time, since the heat capacity of each heat exchange tube member is smaller than that of the tank body member of each header tank, the brazing material covering the outer surface of the heat exchange tube member flows due to heating at the time of brazing. Even in such a case, the molten brazing material covering the outer surface of the tank body member is prevented from flowing toward the corresponding heat exchange tube member, which flow is induced by the molten brazing material covering the outer surface of the heat exchange tube member. Therefore, erosion which causes corrosion of the core material is prevented from occurring on the heat exchange tube members.

In addition, it is possible to suppress occurrence of a brazing failure between each heat exchange tube of the manufactured heat exchanger and a portion of the corresponding tank body around the corresponding tube insertion hole or between each heat exchange tube and the corresponding protrusion portions.

What is claimed is:

1. A heat exchanger comprising:
a plurality of flat heat exchange tubes disposed at predetermined intervals in a thickness direction of the tubes in such a manner that their longitudinal directions coincide with one another and their width directions coincide with an air-flow direction; and two header tanks disposed at opposite longitudinal ends of the heat exchange tubes in such a manner that their longitudinal directions coincide with a direction in which the heat exchange tubes are juxtaposed, opposite end portions of the heat exchange tubes being connected to the corresponding header tanks, each of the header tanks being composed of a tubular tank body which has openings at opposite ends thereof, and closing members which are brazed to the opposite ends of the tank body so as to close the openings, the tank body having a plurality of tube insertion holes which are formed at predetermined intervals in a longitudinal direction of the tank body and each of which is an elongated hole whose longitudinal direction coincides with the airflow direction, protrusion portions which project toward an inner space of the tank body being formed along edges of each tube insertion hole which are located on opposite sides in a width direction of the tube insertion hole and which face each other, and an end portion of each heat exchange tube being inserted into the corresponding tube insertion hole and being brazed to a portion of the tank body around the tube insertion hole and the protrusion portions, wherein each heat exchange tube is formed of a first brazing sheet having a core material and a brazing material covering an outer surface of the core material; the tank body of each header tank is formed of a second brazing sheet having a core material and a brazing material covering an outer surface of the core material and being lower in flowability than the brazing material of the first brazing sheet used to form the heat exchange tube; each of the protrusion portions has a projection height equal to or greater than a thickness of a circumferential wall of the tank body and has a thickness which decreases gradually toward a projecting end thereof; in a first region of a surface of each protrusion portion facing the corresponding heat exchange tube, the first region having a predetermined width as measured from the projecting end, the core material of the second brazing sheet is brazed to the core material of the first brazing sheet by means of the brazing material covering the outer surface of the first brazing sheet; in a second region of the surface of each protrusion portion facing the corresponding heat exchange tube, the second region including the entire surface of each protrusion portion facing the corresponding heat exchange tube excluding the first region,
a distance between the core material of the second brazing sheet and the core material of the first brazing sheet increases gradually from a side closer to the brazed portion toward the outside of the tank body, and a brazing material accumulation space is formed between the core materials of the two brazing sheets; and portions of the core materials of the two brazing sheets which form the brazing material accumulation space are brazed to each other by means of a fillet formed in the brazing material accumulation space, the fillet being formed of a mixture of the brazing material covering the outer surface of the first brazing sheet and the brazing material covering the outer surface of the second brazing sheet.

2. A heat exchanger according to claim 1, wherein a relation of $Y/X=0.40$ to $1.40$ is satisfied, where X is a length of the first region of the surface of each protrusion portion facing the corresponding heat exchange tube, the length being measured in the longitudinal direction of the heat exchange tube, and Y is a length of the fillet formed in the brazing material accumulation space as measured in the longitudinal direction of the heat exchange tube.

3. A method of manufacturing a heat exchanger according to claim 1, comprising: forming each of a plurality of flat, hollow heat exchange tube members through use of the first brazing sheet having said core material and said brazing material covering one surface of the core material, each of the heat exchange tube members having an outer surface covered with the brazing material and having portions to be joined together; forming each of a plurality of tubular tank body members through use of the second brazing sheet having said core material and said brazing material covering one surface of the core material and being lower in flowability than the brazing material of the first brazing sheet used to form the heat exchange tube members, each of the tank body members having an outer surface covered with the brazing material, having portions to be joined together, and having a plurality of tube insertion holes and protrusion portions; rendering the projection height of each protrusion portion of each tank body member equal to or greater than the thickness of the circumferential wall of the tank body, gradually decreasing the thickness of each protrusion portion toward the projecting end thereof, and exposing the core material of the second brazing sheet in a first region of the surface of each protrusion portion facing the corresponding heat exchange tube, the first region having a predetermined width as measured from the projecting end; combining the tank body members and the closing members, and inserting opposite end portions of the heat exchange tube members into the tube insertion holes of the corresponding tank body members; bringing an exposed portion of each protrusion portion of each tank body member where the core material is exposed into contact with the outer surface of the corresponding heat exchange tube member, and, in a second region of the surface of each protrusion portion facing the corresponding heat exchange tube, the second region including the entire surface of each protrusion portion facing the corresponding heat exchange tube excluding the first region, gradually increasing the distance between the surface of the protrusion portion facing the heat exchange tube member and the outer surface of the heat exchange tube member from the side closer to the exposed portion toward the outside of the tank body member, to thereby form the brazing material accumulation space; heating an assembly of the tank body members, the closing members, and the heat exchange tube members to a predetermined temperature so as to braze the to-be-joined portions of each heat exchange tube member to thereby form each of the flat heat exchange tubes, braze the to-be-joined portions of each tank body member to thereby form each of the tank bodies, braze each tank body and the corresponding closing members to thereby form each of the header tanks; and simultaneously with formation of the heat exchange tubes and formation of the header tanks, brazing the exposed portion of each protrusion portion to an outward facing surface of the core material of the first brazing sheet forming the corresponding heat exchange tube member by means of the brazing material of the first brazing sheet covering the outer surface of the heat exchange tube member, and forming in the brazing material accumulation space the fillet formed of said mixture of the brazing material of the first brazing sheet covering the outer surface of the heat exchange tube member and the brazing material of the second brazing sheet covering the outer surface of the tank body member, to thereby braze together portions of the core materials of the two brazing sheets which form the brazing material accumulation space through the fillet.

4. A heat exchanger manufacturing method according to claim 3, wherein the core material of the first brazing sheet is formed of a 3000 series Al alloy, and the brazing material of the first brazing sheet is formed of an Al alloy containing Si in an amount of 6.8 to 8.2 mass % and Zn in an amount of 1.5 to 2.5 mass %, the balance being Al and unavoidable impurities, and which covers one surface of the core material, the brazing material of the first brazing sheet having a cladding ratio of 14 to 18%; the core material of the second brazing sheet is formed of a 3000 series Al alloy, and the brazing material of the second brazing sheet is formed of an Al alloy containing Si in an amount of 4.5 to 5.5 mass % as an element affecting the flowability of the molten brazing material and which covers one surface of the core material, the brazing material of the second brazing sheet having a cladding ratio of 4.5 to 8.5%; and the heating of the assembly of the tank body members, the closing members, and the heat exchange tube members is performed at 585 to 600° C. in a nitrogen gas atmosphere.

\* \* \* \* \*